(EQUIVALENT MIRROR SYSTEM)

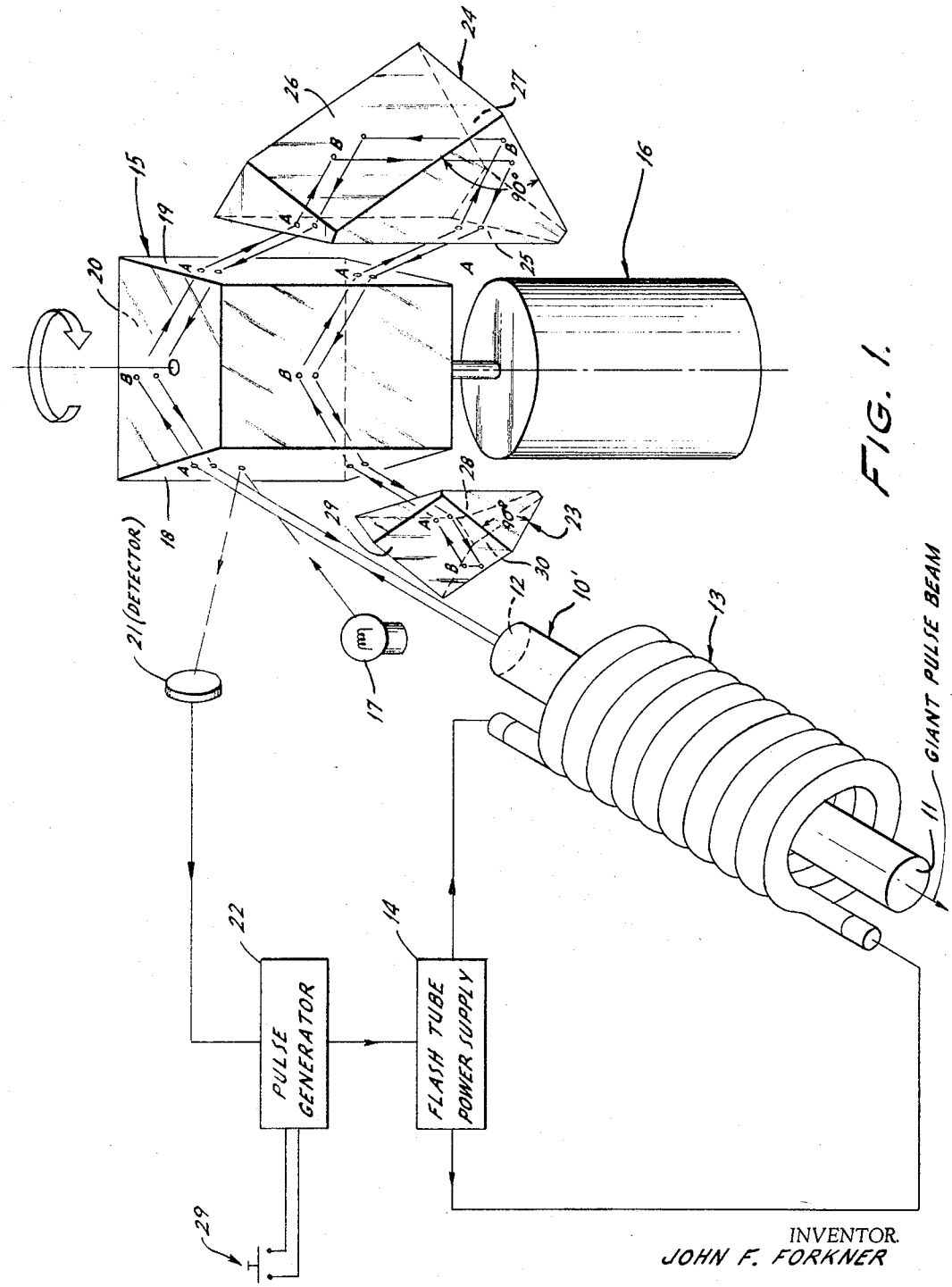

(EQUIVALENT MIRROR SYSTEM UNFOLDED AROUND ROTATING ELEMENT 15.)

INVENTOR.
JOHN F. FORKNER
BY
Harry W. Hargis III
AGENT

INVENTOR.
JOHN F. FORKNER
BY
*Harry W. Hargie III*
AGENT

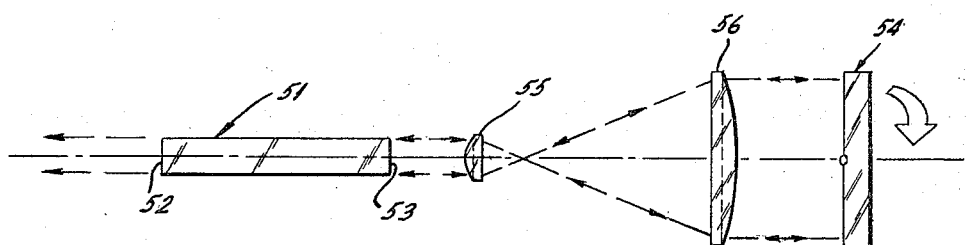
FIG. 9.
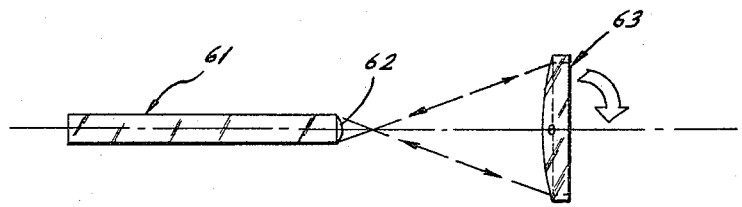
FIG. 10.
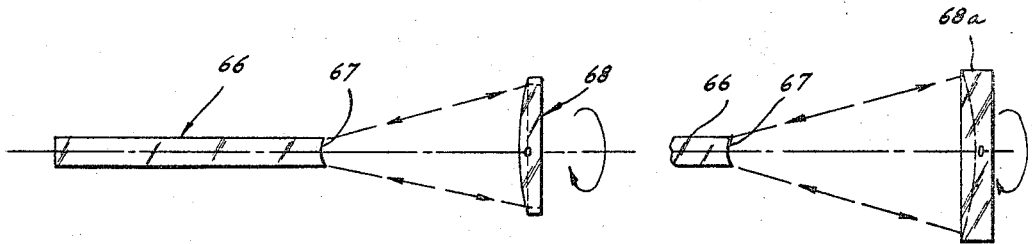
FIG. 11.   FIG. 11A.
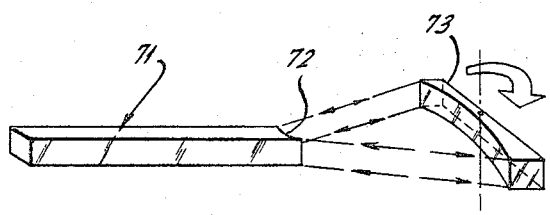   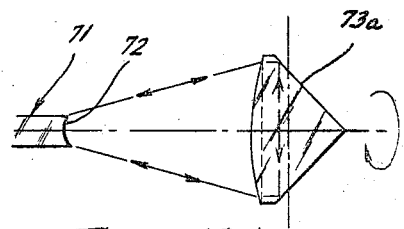
FIG. 12.   FIG. 12A.
INVENTOR.
JOHN F. FORKNER
BY
Harry W. Hargis III
AGENT 3,434,073
RAPID ACTING LASER Q-SWITCH
John F. Forkner, Plymouth Meeting, Pa., assignor to
  Philco-Ford Corporation, a corporation of Delaware
    Filed Feb. 24, 1964, Ser. No. 346,820
U.S. Cl. 331—94.5                                    3 Claims
Int. Cl. H01s 3/00, 3/16; G02f 1/34

ABSTRACT OF THE DISCLOSURE

A relatively high-speed optical shutter for use in the optical system of a laser for greatly increasing its peak power output. In one aspect, the optical shutter comprises a system of prisms arranged to cause multiple impingement of the internal laser beam on a rotatable mirror, whereby to multiply the angular sweep rate of the laser beam as it is reflected back into the laser medium. In another aspect, the optical shutter includes a telescope arranged to increase the apparent rotational speed of the mirror, and hence the angular sweep rate of the beam, by magnifying the width of the beam reflected back into the laser medium.

---

This invention relates to laser apparatus, and more particularly to improvements in so-called Q-spoiling devices of giant-pulse lasers.

In one known form of laser the working element is a single crystal of pink ruby in the form of a cylindrical rod, of for example about one-half centimeter in diameter and 4 centimeters in length, and having flat end faces that are plane to a high degree of accuracy. The ruby rod is disposed between two parallel reflecting surfaces, at least one of which may be formed on the end of the rod. One surface is completely reflecting and the other surface is only partially reflecting. The ruby rod is irradiated, or "pumped," laterally of its axis by light from a high intensity light source, such as a flash lamp, operated usually for a few milliseconds at a time with an input of relatively high value. A fraction of the energy emitted by the flash lamp is absorbed by the ruby crystal. When the energy absorbed from the exciting irradiation exceeds a certain threshold, and a very short time after the start of irradiation, coherent radiation emerges in a narrow beam through the partially reflecting surface which forms one end of the resonant optical system of the laser.

The intensity of the laser beam varies irregularly, it having been observed that the time delays between the start of excitation and the onset of coherent oscillations are not uniform in spite of efforts to keep all experimental variables under control. Once coherent light appears, its intensity will vary greatly and irregularly with "spikes," or pulsations, of durations of about 1 microsecond.

It is possible to overcome the aforementioned irregularities and to increase the peak intensity of the output pulse by temporarily lowering or "spoiling" the Q of the optical system of the laser. By this so-called Q-spoiling the laser crystal can be irradiated, or pumped, past the normal threshold value at which it begins to emit coherent radiation. After the pumping irradiation has attained a condition of saturation, the optical characteristics of the system are again modified by suddenly raising or, "unspoiling," the Q, with the result that a relatively large burst of radiant energy is emitted by the crystal. For example, a conventional laser system which would normally produce a series of spikes having a peak power of 50 kilowatts when operated in the manner just described may achieve a peak output of 5 megawatts. Systems of this type are known in the art as giant-pulse laser systems.

Q-spoiling in the optical system of the laser normally is accomplished by means of a light shutter placed between the ruby rod and one of the reflecting surfaces, or by rotating out of alignment means comprising, for example, a rotating prism or mirror which serves as the fully reflective surface for one end face of the crystal. In this system the pumping or irradiating lamp is triggered to flash so that the pumping begins just before the shutter is opened, or just before the rotating reflective mirror or prism is brought into optical alignment with the end of the laser crystal. The amplitude of the pulse produced is dependent to a large extent upon the rapidity with which the shutter is opened or the reflective surface is brought into optical alignment.

It is an object of this invention to provide, in a Q-spoiling system as described, optical means operative greatly to multiply the effective rotational rate of the reflective means.

It is a further objective of the invention to provide, in a giant pulse laser apparatus, optical means to increase the effective operating speed of the shutter.

The invention contemplates, in one form thereof, that the reflective means comprises a rotating-mirror shutter considerably larger in diameter than the cross-section of a ruby crystal, and interposing a telescope between the rotating mirror and the end of the ruby crystal. In this embodiment the effective rotational rate of the mirror is proportional to the product of its actual rotational rate and the magnification of the telescope.

The invention further contemplates that the laser Q-spoiler may comprise a plurality of prisms, one of which is rotated. The optical path between the two reflecting surfaces of the laser optical system is folded so that energy emitted by the laser rod is caused to be reflected by a face of the rotating prism a plurality of times. This may be achieved by means of suitably positioned, stationary reflectors, such for example, as roof prisms. The multiple reflections from the rotating prism have the effect of multiplying the apparent speed of rotation of the rotating prisms. Thus an increase in the apparent speed of the Q-spoiling action is achieved advantageously without an increase in the prism rotation rate.

Still further, it is contemplated by the invention that the above-described telescope and rotating prism arrangements may be combined to achieve still faster, high frequency shutter operation.

The invention may therefore be briefly summarized as comprising a combination of: a working element capable of laser action; reflective shutter means disposed and adapted to reflect radiation emitted by said element back into the latter; means for establishing the operating speed of said shutter means; and means operable optically to modify the effective operating speed of the shutter.

For a more complete understanding of the invention, reference may be had to the following detailed description, taken in light of the accompanying drawings in which:

FIGURE 1 is a somewhat diagrammatic showing, partly in perspective, of giant-pulse laser apparatus embodying the invention;

FIGURES 9 through 12A comprise additional modified embodiments of the invention, in which different optical systems are utilized.

Figure 3:
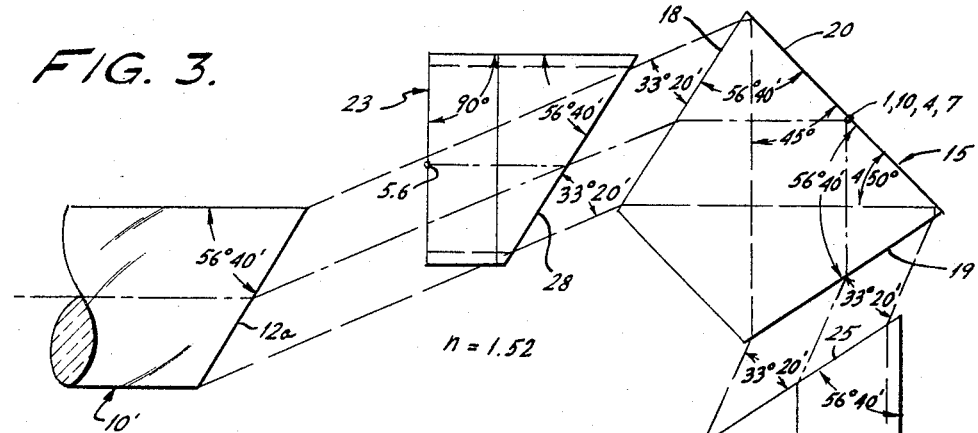
FIGURE 3 is a plan view of the apparatus illustrated in FIGURE 2.

With more particular reference to FIGURE 1, laser apparatus embodying the invention comprises a cylindrically formed crystal 10′ of suitable material, for example pink ruby, having end faces 11 and 12 that are plane to a high degree of accuracy. End face 11 is provided with a partially reflective coating and face 12 has no reflective coating. A helically formed xenon flash tube 13 is coiled about crystal 10′, and is energized by a suitable power supply 14 of known construction. A rotatable prism 15 drivingly coupled with a motor 16, and a lamp 17 disposed and adapted to emit a beam for sequential reflections by external faces of rotating prism 15 onto a detector 21. Reflections by rotating prism 15 of the light beam from lamp 17 will reach detector 21 according to the sequential positional relationships of the outer reflective faces of the prism 15. Detector 21 is constructed and arranged to actuate a pulse generator 22 which in turn triggers power supply 14, as the face 18 of the rotatable prism reaches the position shown, in which position said face reflects the beam onto the detector.

As a practical matter, in view of the relatively high rotational rate of prism 15 and compared with the time required for flash lamp 13 to fire, a typical pulse rate is one per 10 seconds, as may be provided by an operator who actuates a trigger or push-button switch, such as is seen at 29, to fire the laser. The illustrated synchronizing system, upon actuating the trigger switch, operates to fire the prism 15 as rotated into beam reflecting position, or just prior to such optical alignment of prism 15 as to provide for return of the emitted beam to nonreflecting end 12 of laser rod 10′.

The Q-spoiling means comprises stationary prisms 23 and 24 so optically positioned as respects one another and rotatable prism 15, as to provide the illustrated light paths to and from the light transmissive or non-reflective end face 12 of ruby crystal 10′, in accordance with the directional arrows. It will be appreicated that the complete light paths exist only for the illustrated position of the rotatable prism 15, just following energization of xenon lamp 13. The several prisms therefore comprise the fully reflective means for end face 12 of the laser rod, and as will be described in what follows, rotation of prism 15 alternatively spoils and restores the Q of the laser optical system.

In FIGURE 1, locations of all rays of light entering or leaving the prisms are designated by the letter A. The light rays leaving the end 12 of rod 10′ are polarized in a vertical plane, and the prism dimensions and angles are selected so that such rays enter and leave at the so-called Brewster angle at which no reflection losses occur for incident light polarized in the plane of incidence. The Brewster angles are designated in FIGURE 3 by their actual values, and are based on materials having a refractive index of 1.52. However, it will be understood that these values are for illustrative purposes only, and materials having other refractive indices may be used.

All reflections inside the prisms are designated by the letter B and occur at less than the critical angle. Hence, these reflections are lossless, or totally internal. The only losses within the optical system comprising the shutter and reflector means are due to the prism material itself. These losses can be minimized substantially by selecting the proper material for the wave length of the light emitted by ruby crystal 10′.

Figure 2:
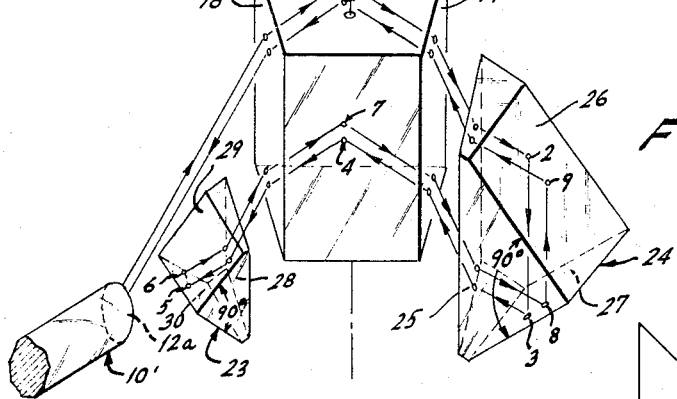
FIGURE 2 is a perspective view, on a reduced scale, of a portion of the apparatus illustrated in FIGURE 1, and in which one of the elements has been modified slightly.

It will be noted that the difference between the apparatus illustrated in FIGURE 2 and the corresponding apparatus illustrated in FIGURE 1 is that the ruby rod or crystal 10′ shown in FIGURE 2 has its non-reflective face 12a cut at the Brewster angle, whereas the corresponding face 12 in FIGURE 1 is cut normal to the major axis of the rod. Also it will be noted in FIGURE 2 that the letters A and B have been replaced with numerals 1 to 10 that correspond to the sequential paths of the light beam through the prisms, as will be more fully discussed in what follows.

Figure 4:
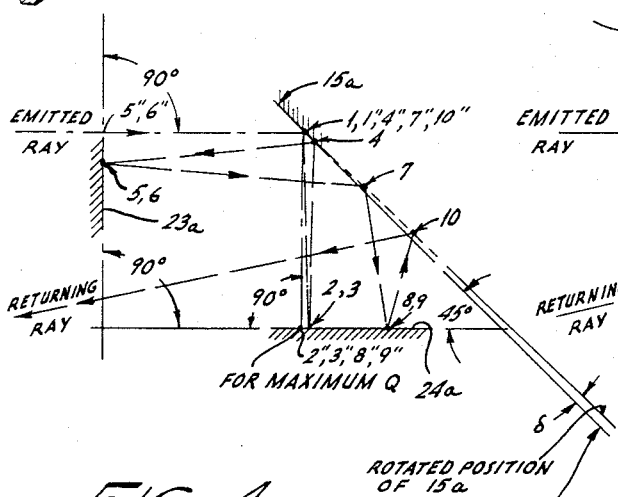
FIGURE 4 is a somewhat diagrammatic showing of apparatus illustrated in FIGURES 1 to 3, and demonstrating optical principles upon which the invention is based.
Figure 5:
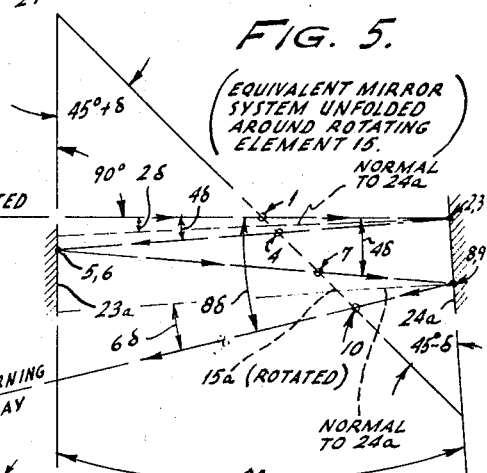
FIGURE 5 is a further diagrammatic showing of the optical principles of the invention.

It can be shown, and as will be more fully understood from the equivalent mirror systems illustrated in FIGURES 4 and 5, that upon rotation of prism 15 through a predetermined given angle, beams reflected, as at points B in this prism, will each be rotated or swept through twice the said given angle. It follows, therefore, that each reflected beam sweeps at double the rotational rate of the reflective surface. Since there are four such reflections, the returning beam will sweep across the end of the laser rod at an angular speed eight times the rotational speed of prism 15.

While the light rays or beams in FIGURES 1 and 2 are shown as being spaced for the sake of clarity in tracing the path of the beam from and to the rod in restoration of reflection, or "unspoiling" of the Q, the corresponding rays are illustrated as coincident rays in FIGURE 3. Rays to either side thereof also have been included to indicate the limits of the lateral disposition of the rays.

With particular reference to FIGURE 2, and assuming that xenon lamp 13 has just been fired to irradiate rod 10′, an emitted beam leaving the end 12a of laser rod 10′ will enter face 18 of rotating prism 15, thereafter to impinge upon reflection point 1 on face 20, from which the beam will be reflected to leave face 19 of the rotating prism. The beam will then enter the vertical face 25 of stationary roof prism 24 thereafter to impinge upon reflection point 2 which lies in the plane of the sloping face 26 of prism 24. The beam then will be deviated through a 90° angle to impinge upon reflection point 3 on the lower sloping face 27 of prism 24, and at this point the beam will be deviated again through a 90° angle to emerge from the vertical face 25 of prism 24 and will enter the vertical face 19 of rotating prism 15. The beam then will be deviated through a 90° angle (other angles of deviation could be used provided that total internal reflection occurs at surface 20) by reflection at point 4 to emerge from the vertical face 18 of prism 15 and enter the vertical face 28 of prism 23. The beam is then turned 180° by successive reflections at points 5 and 6 upon surfaces 30 and 29, respectively, to emerge from vertical face 28 of prism 23 and enter vertical face 18 of rotating prism 15. The beam then will be reflected at point 7 on face 20, emerge from vertical face 19 of prism 15, and enter vertical face 25 of prism 24 to be turned 180° by successive reflections from points 8 and 9 on faces 27 and 26, respectively. The reflected beam again will emerge from the vertical face 25 of prism 24 and enter vertical face 19 of prism 15, reflected at point 10 on face 20 to emerge from the other face 18 of prism 15 and return in a sweeping motion to end 12a of laser rod 10′. Shortly thereafter a giant pulse beam is emitted from partially reflective face 11, as indicated in FIGURE 1.

By virtue of the rotation of prism 15, the beam returned in restoration of reflection will have been deviated twice the angle through which the prism has turned for each of internal reflections 1, 4, 7, and 10 by face 20. Accordingly the sweep rate of the returning beam will be eight times the rotational rate of prism 15, and substantially complete reflection will be achieved only for the very short period that the returning beam impinges on the laser rod. Importantly, the Q is restored with such rapidity as to produce a giant-pulse, the ideal condition for achieving a giant-pulse being the restoration of Q from zero to maximum in zero time. If the Q is restored with insufficient rapidity, no giant pulse will occur.

It will therefore be appreciated that the alternate spoiling and restoring of the optical path occurs more rapidly than with single mirror systems heretofore used. Also, it will be appreciated that the rotational speed of the rotatable prism can be further multiplied optically by inclusion of additional reflective prisms positioned to reflect the beam back into the rotating prism prior to return of the beam to the laser rod.

In the interest of further describing the invention and with reference to FIGURE 4, the prisms of the optical system illustrated in FIGURES 1, 2, and 3 have been replaced generally by mirrors bearing the same reference numerals as the corresponding prisms but with the suffix $a$ applied.

To simplify the FIGURE 4 showing, the double reflection points of prisms 23 and 24 have been replaced with single reflection points—for example points 2 and 3 are combined as point 2, 3, points 5 and 6 as point 5, 6, and points 8 and 9 as point 8, 9.

The numbers 1 to 10 therefore correspond generally to the reflection points similarly designated in FIGURES 2 and 3. In FIGURE 4 the mirror 15$a$ has been rotated through an angle $\delta$ and reflection points 1, 4, 7, and 10 have been taken at the rotated positions of the mirror 15$a$.

Maximum Q, or substantially complete reflection, is obtained with reflection occurring while mirror 15$a$ is in the illustrated non-rotated position. Points of reflection affording maximum Q are indicated by numerals 1″ to 10″, and by notation directed to mirror 24$a$. In the position of mirror 15$a$ at which maximum Q occurs, the illustrated emitted ray is returned to the laser rod substantially along the same path as it left. In terms of the reference numerals, the emitted ray first is reflected at point 1″ on mirror 15$a$, thence impinges at "point" 2″, 3″ on mirror 24$a$, and is reflected back onto point 4″ on mirror 15$a$ from which it is reflected onto "point" 5″, 6″. The ray then is caused to follow the same path with reflections at point 7″ on mirror 15$a$, "point" 8″, 9″ on mirror 24$a$, back to point 10″ on mirror 15$a$ for return to the laser rod along the line on which the ray was emitted. While points 1 and 1″ have been illustrated as being substantially coincident, it will be understood that the point 1 will have been displaced slightly due to rotation of mirror 15$a$.

With reference to FIGURE 5, mirror 24$a$ has been folded about the illustrated rotated position of mirror 15$a$. In the resulting diagram, for each time the beam strikes the mirror 24$a$ (at points 2, 3 and 8, 9) the beam is deviated four times the angle of rotation $\delta$ of prism 15$a$. Since the mirror 24$a$ is struck twice—2, 3 essentially are the same points, as are 8, 9—the total deviation is eight times the angular rotation of the rotating mirror 15$a$. Considered another way, it can be demonstrated, using the geometry of FIGURE 5, that since the normals to the mirror through points 2, 3 and 8, 9 are parallel, then the total deviation is the sum of the original angle of incidence ($2\delta$) and the final angle of reflection ($6\delta$), i.e. $2\delta + 6\delta = 8\delta$, as indicated on the diagram.

Since the returning beam sweeps at eight times the angular rotational rate of the prism 15, the effective shutter operation, in restoring the reflection, occurs in a fraction of the time achieved with a simple rotating mirror optical system.

Figure 6:
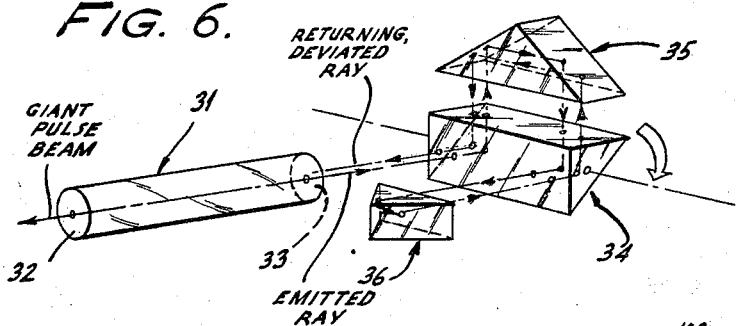
FIGURE 6 is a view similar to FIGURE 2 and illustrating a modified embodiment of the invention.

With reference to the modified embodiment of the invention illustrated in FIGURE 6, laser rod 31 has a partially reflective end face 32 and a substantially non-reflective, light transmissive end face 33. Prism 34 is rotatable about its longitudinal axis, has the cross-section of a 45° x 45° x 90° triangle, and is in optical alignment with laser rod 31, and also with a stationary 45° x 45° x 90° roof prism 35, and a like but smaller, stationary roof prism 36. In the illustrated position of the rotatable prism, and for the sake of convenience, the ray of light emitted from face 33 of laser rod 31, immediately following irradiation of the same, is shown as returning along a path parallel to the path along which it is emitted in restoring the Q of the system. The light ray will travel from rod 31 for multiple reflections by the prisms 34, 35, and 36, and return to the rod 31 via the paths to which directional arrows have been applied. Thereafter, the giant pulse is emitted from the partially reflective end 32 as shown. In such an arrangement, as was the case with the apparatus illustrated in FIGURES 1 to 5, wherein the angle of deviation was increased by twice the angle of prism rotation for each of four reflections by the rotating prism, the ray returning to the rod 31 will have a sweep rate eight times the rotational angular velocity of prism 34.

Figure 7:
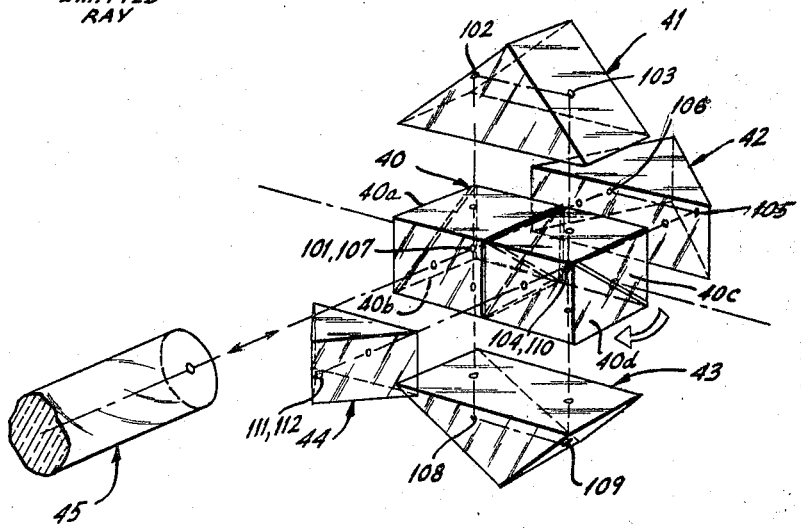
FIGURE 7 is a view similar to FIGURE 6 and illustrating another modified embodiment of the invention.

In FIGURE 7 there is illustrated a modification of the apparatus shown in FIGURE 6, the reflecting faces of the rotating prism 40 being doubled as compared with prism 34 of FIGURE 6, and the number of roof prisms being increased to four, as seen at 41, 42, 43 and 44. There are eight reflections by the rotating prism of this system to make the sweep rate of the emitted ray of light 16 times the prism angular velocity.

With more particular reference to FIGURE 7, each of prisms 41, 43, and 44 has the same configuration as prisms 35 and 36, for example, in that their roof surface portions lie in planes disposed at right angles to one another. The rotating prism 40 comprises two rotatably mounted pairs of 45° x 45° x 90° cross-sectional prisms 40$a$, 40$b$, 40$c$ and 40$d$ with hypotenuse faces spaced approximately .005 in. apart. The mating hypotenuse faces of one pair of prisms (40$a$ and 40$b$) are disposed at a right angle with respect to the mating faces of the other pair (40$c$ and 40$d$).

In the interest of clarity, the rays entering and leaving the several prisms are illustrated as travelling along the same light paths, and will be traced by means of numbers applied to the reflection points. Starting with the ray as it leaves the laser rod following irradiation, it will first impinge a 101 upon the reflective face of prism 40$a$ to be reflected upward for successive reflections at 102 and 103 by sloping faces of roof prism 41. The ray leaves prism 41 to impinge at 104 upon the reflective face of prism 40$c$ for successive reflections horizontally at 105 and 106 by sloping faces of roof prism 42. The ray then enters prism 40$b$ to be reflected at 107 on its reflective face downwardly into roof prism 43 for successive reflections at 108 and 109. The ray then travels upwardly to enter prism 40$d$ for reflection at 110 on its reflective face, the ray then leaving the rotating prism to enter roof prism 44 for successive reflections at 111 and 112, from the sloping faces of this prism. Since the emitted and returned rays are being considered as coincident, points 111 and 112 also are coincident, and the ray can be described as returning to the laser rod from point 112 by successive return reflections at points 110, 109, 108, 107, 106, 105, 104, 103, 102, 101.

Whereas the embodiment illustrated in FIGURE 6 restores reflection to the system, or unspoils the Q, substantially eight times faster than a simple rotating mirror, the embodiment illustrated in FIGURE 7 achieves Q restorations substantially sixteen times faster than does a simple rotating mirror.

Figure 8:
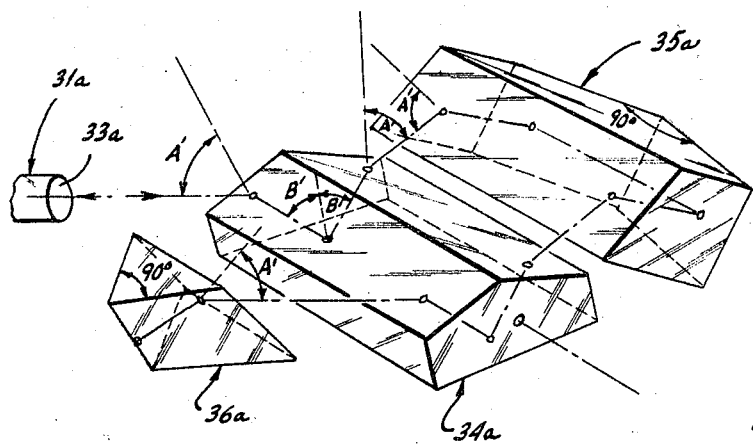
FIGURE 8 is a view similar to FIGURES 6 and 7 and illustrating a further modified embodiment of the invention.

The apparatus illustrated in FIGURE 8 is similar to that shown in FIGURE 6, with the exception that the prisms are so shaped and disposed that the angle A′ at which the light enters a prism—each identified by the same reference numeral as the corresponding prism in FIGURE 6, with the suffix $a$—is the Brewster angle for the prism material. Therefore, no reflection losses occur at external surfaces of the prisms for light polarization in the vertical plane, as is the case with the light beam leaving the laser rod. The internal angles of reflection B′ are greater than the critical angle for the prism material and hence total reflection occurs in the rotating prism 34$a$. The reflection angles B′ in the two stationary prisms 35$a$ and 36$a$ of the same material also are total reflections. As is the case with apparatus shown in FIGURE 6, this arrangement produces an angular sweep of the energy returning to the laser rod at a rate eight times the rotational rate of the rotating prism, and is thus substantially four times as rapid in sweeping the beam as is a simple mirror.

Turning now to the modified embodiment of the invention illustrated in FIGURE 9, a laser rod 51 having partially reflecting face 52 and a non-reflective face 53 is optically aligned with a rotatable plane mirror 54. The optical equivalent of a telescope is interposed between the non-reflective end 53 of laser rod 51 and the mirror 54, the telescope comprising a plano-convex eyepiece lens 55 and a like objective lens 56, each arranged as shown. Mirror 54 and objective lens 56 are of the same diameter, larger than the cross-sectional area of laser rod end 53.

The paths of light rays emitted from and reflected onto non-reflecting end 53 of the rod 51 are indicated for convenience as travelling the same paths in either direction, and under condition of maximum reflection. The path of the giant pulse beam is indicated by arrows emanating from the partially reflecting face 52. While means for irradiating rod 51 has not been illustrated, it will be appreciated that an arrangement similar to the one illustrated in FIGURE 1 may be utilized.

The gain of the telescope in FIGURE 9 effectively multiplies the rotational rate of the mirror inasmuch as the beam width emitted by end face 53 is magnified to the width of mirror 54 for a given rotational rate of the mirror. It follows, therefore, that if a wider reflected beam is swept at the angular rotational rate afforded by the rotating mirror, a resultant increase in beam velocity across the end 53 of rod 51 is achieved. For example, if mirror 54 rotates at 20,000 r.p.m., a telescope having a gain of 5 has the effect of a smaller diameter mirror rotating at 5 times 20,000 r.p.m., or 100,000 r.p.m.

This principle of shutter speed magnification may be set forth as follows, using exemplary values as tabulated:

Laser rod diameter _____inch__ 0.25
Laser beam width (half-angle) _____sec. arc__ 10
Mirror angular velocity (400 r.p.s.) ___r.p.m.__ 24,000
Telescope magnification _____ 5×
Diameter of objective lens 56 and mirror 54
 (5×0.25") _____inches__ 1.25
Pulse duration $$\frac{10 \text{ sec. arc}}{(2) \times (5) \times 400 \text{ r.p.s.} \times 360 \frac{\text{degress}}{\text{rev.}} \times 3600 \text{ sec. arc/degree}}$$

Pulse duration (time) _____seconds__ $2 \times 10^{-9}$

The factor (2) in the denominator represents the increase in sweep rate due to rotation of mirror 54.

In FIGURE 10, the embodiment illustrated in FIGURE 9 has been modified substantially by making the non-reflective end of a laser rod 61 into a convex surface 62 and making the non-reflective surface of the rotatable mirror 63 convex as shown. This arrangement achieves the same magnification of the rotational speed of the mirror as does the embodiment shown in FIGURE 9, since the reflected beam width is again increased to that of the rotating mirror 63.

In the apparatus of both FIGURES 9 and 10 the beams include crossover points which can produce an energy concentration sufficient to ionize air in the region thereof. This latter problem, should it arise, can be overcome by the lens arrangement illustrated in FIGURE 11, in which the non-reflective end 67 of the laser rod 66 is made concave, and the rotatable mirror 68 is the same as the mirror 63 of FIGURE 10. The concavely curved surface of laser rod 66 serves as a negative lens, and in combination with curved rotatable mirror 68 comprises a Galilean telescope.

The rotatable mirror of FIGURE 11 can be also modified, if desired, to take the concave form 68a shown in FIGURE 11a, in which the concave surface in made reflective.

Still further modified apparatus embodying the invention is illustrated in perspective in FIGURE 12 and is similar to that illustrated in FIGURE 11a. The primary difference is that the laser rod 71 is rectangular in cross section and its concave, non-reflective end 72 projects rays onto a similarly rectangular concave reflective face of a rotatable mirror 73. In this rectangular arrangement each of the curved surfaces is cylindrical, and magnification is normal to the axis of rotation of the mirror 73. An advantage of this arrangement is that the mass of the rotating mirror is less than that of one with a generally spherical reflective surface, as in the previous example.

In FIGURE 12A, the rotatable mirror of FIGURE 12 has been replaced with a rotatable roof prism 73a provided with a convex face disposed for alignment with the concave face of the laser rod once for each revolution of the prism, and the light paths again are indicated by means of arrows.

In any of the embodiments illustrated in FIGURES 9 to 12A, the relatively large reflective surfaces reduce the power density at these surfaces, whereby there is less energy concentrated in the optical system. This characteristic permits operation at higher energy levels without damage to reflecting surface.

From the foregoing description it will be appreciated that the invention affords means for advantageously increasing the effective speed of a mechanical shutter for a laser device by optical means disposed in novel cooperative relationship with the shutter and the working element of the device.

I claim:

1. In laser apparatus of the type including an active laser medium in the form of a rod having opposite end face portions, one face portion being partially light reflective and the other face portion being substantially totally light transmissive, means for pumping said laser medium to effect emission of a light beam from said other face portion, rotatable reflector means for reflecting said beam of light back onto said other face portion when said reflector means is in one of its rotated positions, and means for rotating said reflector means at a predetermined speed, the improvement comprising: optical means for reducing the duration of impingement of the reflected beam of light of said other face to a value less than the duration of impingement corresponding to the recited rotational speed of said reflector means, said optical means including fixed reflector means oriented with respect to said rotatable reflector means to effect a plurality of reflections of said beam of light by said rotatable reflector means prior to reflection of such beam by said rotatable reflector means onto said other face portion of said laser medium.

2. In laser apparatus according to claim 1, wherein said optical means comprises at least a first stationary roof prism and a second stationary roof prism, said first roof prism being positioned to receive light reflected by said rotatable reflector means and effective to return such reflected light to said rotatable reflector means, said rotatable reflector means being oriented to reflect said light received from said first roof prism onto said second roof prism, said prisms in the recited reflector orientation being effective to return said light to said rotatable reflector means for reflection onto said other face of said laser medium.

3. In laser apparatus according to claim 2, wherein said rotatable reflector means comprises a prism having external, light transmissive faces and an internal reflective face, said laser medium, said rotatable prism, said first roof prism, and said second roof prism being so constructed, and oriented relative to one another, that light enters and leaves external faces thereof at the Brewster angle with respect to said faces and in that internal reflections of light are at angles greater than the critical angles of the respective recited elements of the apparatus.

(References on following page)

References Cited

UNITED STATES PATENTS

| | | | |
|---|---|---|---|
| 2,670,660 | 3/1954 | Miller | 350—285 |
| 2,758,502 | 8/1956 | Scott et al. | 350—7 |
| 3,179,899 | 4/1965 | Fox | 331—94.5 |
| 3,267,804 | 8/1966 | Dillion | 331—94.5 X |
| 3,274,512 | 9/1966 | O Kaya | 331—94.5 |
| 3,297,876 | 1/1967 | DeMaria | 331—94.5 |
| 3,310,753 | 3/1967 | Burkbalter | 331—94.5 |
| 3,328,112 | 6/1967 | Soules et al. | 331—94.5 |
| 3,315,117 | 4/1947 | Benson | 331—94.5 |

FOREIGN PATENTS 608,711   3/1962   Belgium.

OTHER REFERENCES

Bardocz: "Zertschrift-Für Maturforschung," vol. 10A, 1955.

JEWELL H. PEDERSEN, *Primary Examiner.*

E. BAUER, *Assistant Examiner.*

U.S. Cl. X.R.

350—285, 286

Notice of Adverse Decision In Interference

In Interference No. 97,162 involving Patent No. 3,434,073, J. F. Forkner, RAPID ACTING LASER Q-SWITCH, final judgment adverse to the patentee was rendered June 9, 1972, as to claims 1 and 2.

[*Official Gazette November 21, 1972.*]